(No Model.)
J. A. ADAMS.
THILL SUPPORT.
No. 455,678. Patented July 7, 1891.
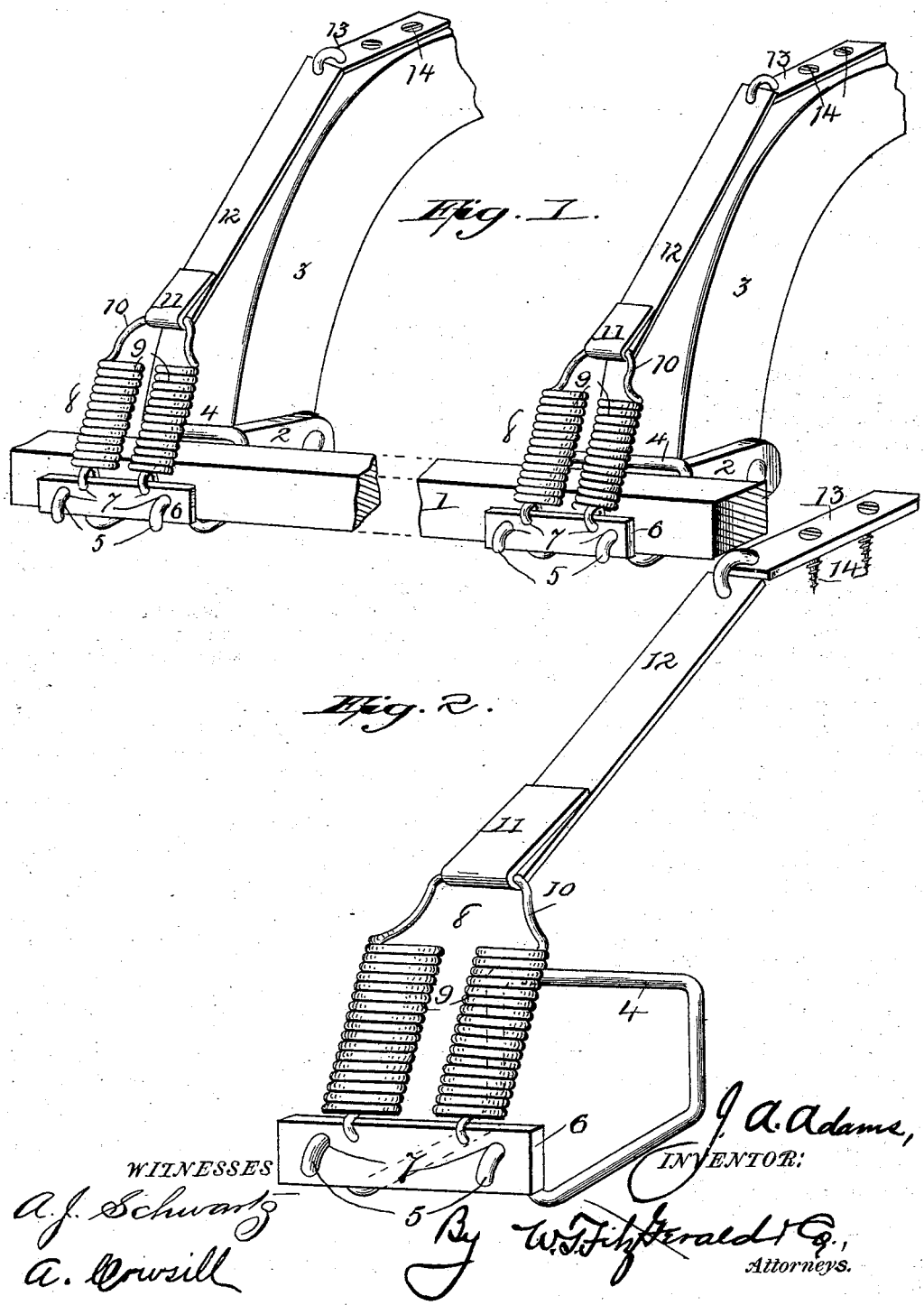

UNITED STATES PATENT OFFICE.

JOE ALLEN ADAMS, OF DRESDEN, TENNESSEE.

THILL-SUPPORT.

SPECIFICATION forming part of Letters Patent No. 455,678, dated July 7, 1891.

Application filed December 26, 1890. Serial No. 375,817. (No model.)

*To all whom it may concern:*

Be it known that I, JOE ALLEN ADAMS, a citizen of the United States, residing at Dresden, in the county of Weakley and State of Tennessee, have invented certain new and useful Improvements in Shaft-Supporters; and I do hereby declare the following to be a full, clear, and exact description of the invention, such as will enable others skilled in the art to which it appertains to make and use the same.

My invention consists in a new and improved shaft-supporter which will take the weight of the shafts off the horse, and which will support the shafts in a raised position when the horse is removed from between them or when he is detached from the vehicle during a runaway; and my invention will be hereinafter fully described and claimed.

Referring to the accompanying drawings, Figure 1 is a perspective view illustrating my new and improved shaft-supporter in its operative position, and Fig. 2 is a detail view of one of the supporters on an enlarged scale.

The same numerals of reference indicate corresponding parts in both the figures.

Referring to the several parts by their designating-numerals, 1 indicates a buggy-axle, to the front of which are secured the clips 2 2, between which the rear ends of the shafts 3 are pivotally secured.

My invention is applicable to the shafts of a buggy or any other vehicle, and consists, first, of the securing-loops 4 4, each of which fits at its center over one of the clips 2, and then extends down and under the axle to the rear of the same, where its ends are bent to form hooks 5. On the hooked rear ends of each securing-loop 4 is fitted a metal plate 6, having apertures 7, through which the hooks 5 pass, and to each plate 6 is secured a double-spiral spring 8. These springs are made of a single heavy steel wire, which is bent to form the two coils or spirals 9, connected at their upper ends by the loop 10. This loop passes through a flat eye 11, riveted to the lower end of a metal strap 12, the upper end of which is engaged with the hooked end of a hook-plate 13.

To secure my device in position, the springs are secured to the axle, as shown, and the shafts are then raised to the desired height, when the hook-plates 13 are secured on top of the shafts by screws 14 passing through openings in the said plates.

From the foregoing description, taken in connection with the accompanying drawings, the construction, operation, and advantages of my shaft-supporter will be readily understood. It will be seen that my shaft-supporter is strong and durable in its construction. When a horse is loosed from the buggy or other vehicle, it can be led out and the shafts will be held up without the trouble of hunting for a stick or other support, and without any further attention on the driver's part; also, in case of a runaway when the horse breaks loose the shafts will be held up, and thus prevented from striking the ground and tearing up the buggy, as will be readily understood.

Having thus described my invention, what I claim, and desire to secure by Letters Patent, is—

The shaft-support consisting of the securing-loops 4, the plate 6, the double-spiral springs 8, the metal straps 12, and the hook-plates 13, substantially as set forth.

In testimony whereof I affix my signature in presence of two witnesses.

JOE ALLEN ADAMS.

Witnesses:
R. B. BRIZENDINE,
J. L. STOREY.